US008584386B2

(12) United States Patent
Catoira

(10) Patent No.: US 8,584,386 B2
(45) Date of Patent: Nov. 19, 2013

(54) LUMINESCENT ELECTRONIC SOUVENIR DEVICE

(76) Inventor: Jose Daniel Martin Catoira, Brasilia (BR)

(*) Notice: Subject to any disclaimer, the term of this patent is extended or adjusted under 35 U.S.C. 154(b) by 0 days.

(21) Appl. No.: 13/031,866

(22) Filed: Feb. 22, 2011

(65) Prior Publication Data

US 2011/0203145 A1 Aug. 25, 2011

(30) Foreign Application Priority Data

Feb. 22, 2010 (BR) ..................................... 1001370

(51) Int. Cl.
*G02B 27/08* (2006.01)

(52) U.S. Cl.
USPC ................................ 40/442; 40/427; 359/617

(58) Field of Classification Search
USPC ............................ 40/219; 359/616; D21/403
See application file for complete search history.

(56) References Cited

U.S. PATENT DOCUMENTS 3,611,603 A * 10/1971 Gesner ............................ 40/564
3,748,013 A * 7/1973 Orans ........................... 359/617
3,809,879 A * 5/1974 Gonzalez ....................... 359/617
4,164,823 A * 8/1979 Marsico ........................... 40/427
4,494,820 A * 1/1985 Klawitter ....................... 359/616
5,276,599 A * 1/1994 Neeley ........................... 362/301
6,644,819 B2 * 11/2003 Nelson .......................... 359/616
7,207,682 B2 * 4/2007 Stephens ....................... 359/616
2009/0293329 A1 * 12/2009 Kim ................................ 40/442

FOREIGN PATENT DOCUMENTS

JP 2004151613 A * 5/2004

OTHER PUBLICATIONS

Translation of Japanese JP02004151613A Matsui.*

* cited by examiner

*Primary Examiner* — Casandra Davis
(74) *Attorney, Agent, or Firm* — SmithAmundsen LLC; Dennis S. Schell

(57) ABSTRACT

An illuminating electronic gift or souvenir device a case in the shape of a small telescope, binocular or monocular and an internal electronic circuit including a type of integrated circuit and luminescent elements such as LEDs or similar lights which cause, upon actuating a switch on the outside, multiple and diverse lighting effects that lead to a visual effect that simulates a starry sky or galaxies in motion, inspiring the imagination of the user of the device. The circuit can be programmed to present lighting effects in its interior that are static or changing.

12 Claims, 4 Drawing Sheets

LUMINESCENT ELECTRONIC SOUVENIR DEVICE

BACKGROUND AND SUMMARY

The present disclosure describes an electronic souvenir device having an attractive monocular or binocular shaped case which contains inside an electronic circuit with a series of LED lamps that will light in a selective or random fashion when a switch is pressed. The switch is discretely located in the outside lateral facet of the device. When the switch is pressed, and the eye is held near the upper part of the ocular as you would do to look into binoculars or monocular, the lights flash on and off in a random fashion in its interior in different colors and locations. The effect is multiplied by a set of mirrors geometrically placed to produce a visually attractive phenomena at times simulating the view of the stars or galaxies through a real telescope at night. This star effect and the association of the souvenir device to important events and its celebrity participants, such as famous soccer players in a soccer tournament, or other athletes, with their image placed on the exterior of the device should motivate spectators to purchase it as a souvenir/memorabilia of the event. If marketed at an accessible price, the spectators of such events or even those who did not attend will be motivated to purchase such a souvenir device.

The device produces a new type of effect or result that uses technology to cause an association between stars as seen through a telescope with "stars" or "celebrities" that people are familiar with in their day to day life.

The business of souvenirs and gifts is certainly very well developed and new devices are constantly created by the industry with the goal to attract the tourists and visitors leading to the sale of new and attractive items. No presently available gift or souvenir with the proposed characteristics is known to the inventors.

Additional features of the disclosure will become apparent to those skilled in the art upon consideration of the following detailed description of the illustrative embodiment.

BRIEF DESCRIPTION OF THE DRAWINGS

The detailed description particularly refers to the accompany figures in which.

DESCRIPTION OF THE ILLUSTRATIVE EMBODIMENT

Figure 1:
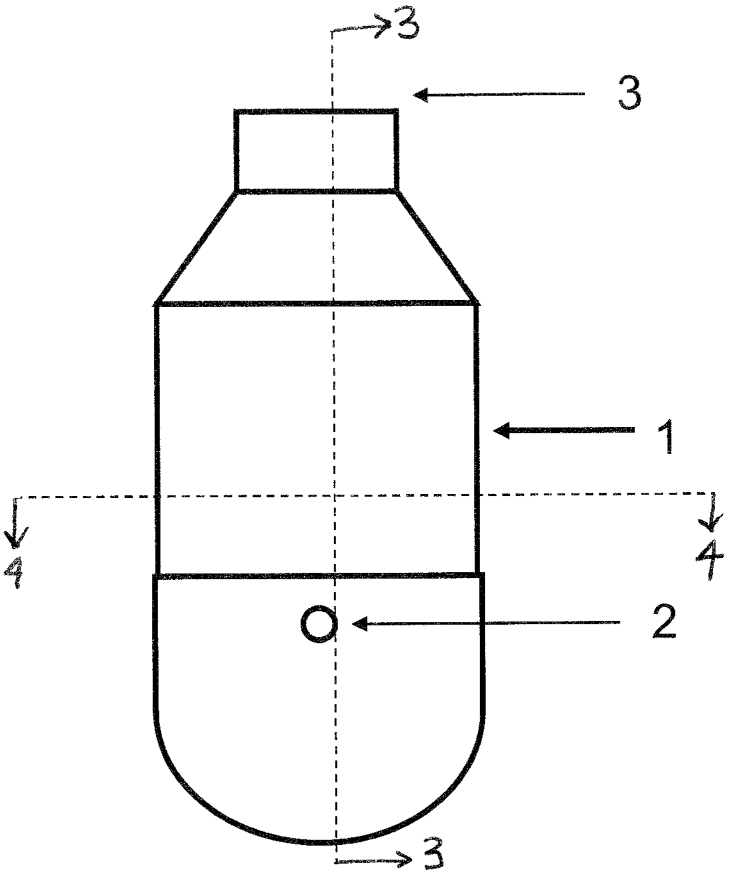
FIG. 1 is a side view of an illustrative appearance of the device.

For the purposes of promoting and understanding the principals of the invention, reference will now be made to one or more illustrative embodiments shown in the drawings and specific language will be used to describe the same.

The proposed device is made of two separate parts. The external case is a mechanical part that can be made of plastic in the shape of a monocular or binoculars, with the appearance of a device used to view distant objects or effects. This case is decorated in a way to call immediate attention of consumers and it can also have the specific colors of events or teams, if any, and will have an opening in one end for viewing the interior, which is initially dark. In the dark interior will be located a circuit with micro LED's and a progressive counter chip, which once powered by the battery and switched on by a switch located in the lateral side of the device, will continually flash lights in an alternating flashing on and off of the LEDs in the interior, causing the effects of varying lights and colors of great visual interest. A set of mirrors placed in a polygonal shape in the interior of the device will cause the colored lights to multiply as they are reflected by the mirrors, leading to unlimited visual effects, providing relaxing and pleasurable visual sensory stimuli. The circuit can be designed to allow the LEDs and mirrors to remain static while still generating a new, different visual effect with each pressing of the on switch of the device.

Figure 7:
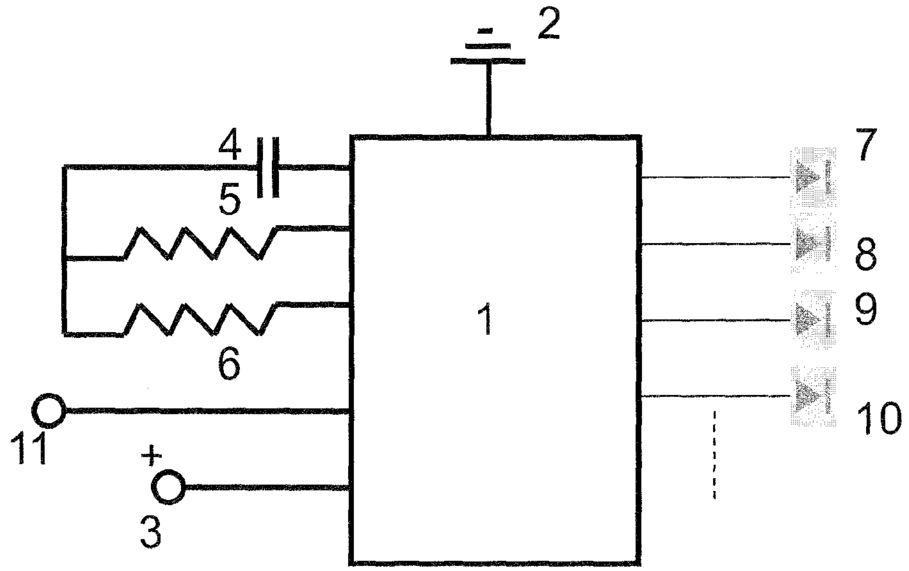
FIG. 7 is a schematic view of the electrical circuit and LEDs of the device of FIG. 1.

It is important to note that the shapes shown in the figures are illustrative and are not intended to pre-determine or limit the claimed scope in any way. The case could have straight or curved walls of different dimensions, and the mirrors in its interior will reflect the multiply the light based on whatever prism design is used in the assembly. The prism could be triangular, square or polygonal with varied numbers of faces. In fact, the internal illumination and its lighting effects can vary tremendously from static illumination with different colors with each pressing of the on switch, all the way to dynamic illumination with constant changing of colors at different speeds. All that is required for various lighting effects is to choose from variations for some components of the internal electronic circuit, for example, those shown in FIG. 7. Additionally, a variable component can be provided in the circuit in order to give the consumer the possibility of changing speed parameters in the blinking of the LEDs. Additionally, the integrated circuit can be programmed to present lighting effects that are static or changing.

FIG. 1 represents a side view of an illustrative appearance of the device. The shape of the case 1 doesn't determine in any way the internal properties of the device. As mentioned above, the case 1 can have straight or curved lines for its shape and the opening for viewing could be at the top or along a side. The on/off switch 2 will initiate the multicolor internal light effect. A possible position is shown for the observation opening 3 used to observe the interior of the device with its light effect once switch 2 is activated. Dashed line 4 defines the cross-sectional plane for the internal view that is shown on FIG. 3. The dashed line 5 shows the cross-sectional plane of the horizontal internal view depicted in FIG. 4.

Figure 2:
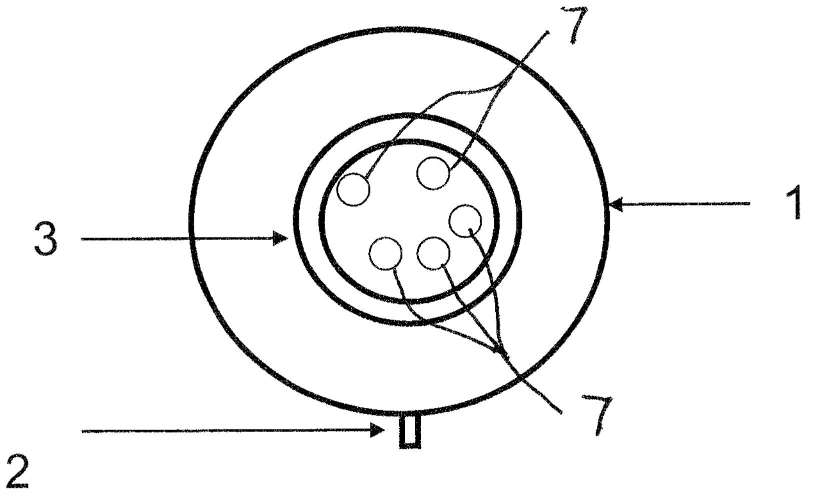
FIG. 2 is a top view of the device of FIG. 1.

FIG. 2 shows the device as seen from above. In this view the micro LEDs are illustrated through the observation opening 3, which are only lighted when the on switch 2 is pressed. Element 1 represents the external contour of the device. Element 2 represents the on/off switch. The observation opening 3 can be designed like that of a telescope, monocular or binocular.

Figure 3:
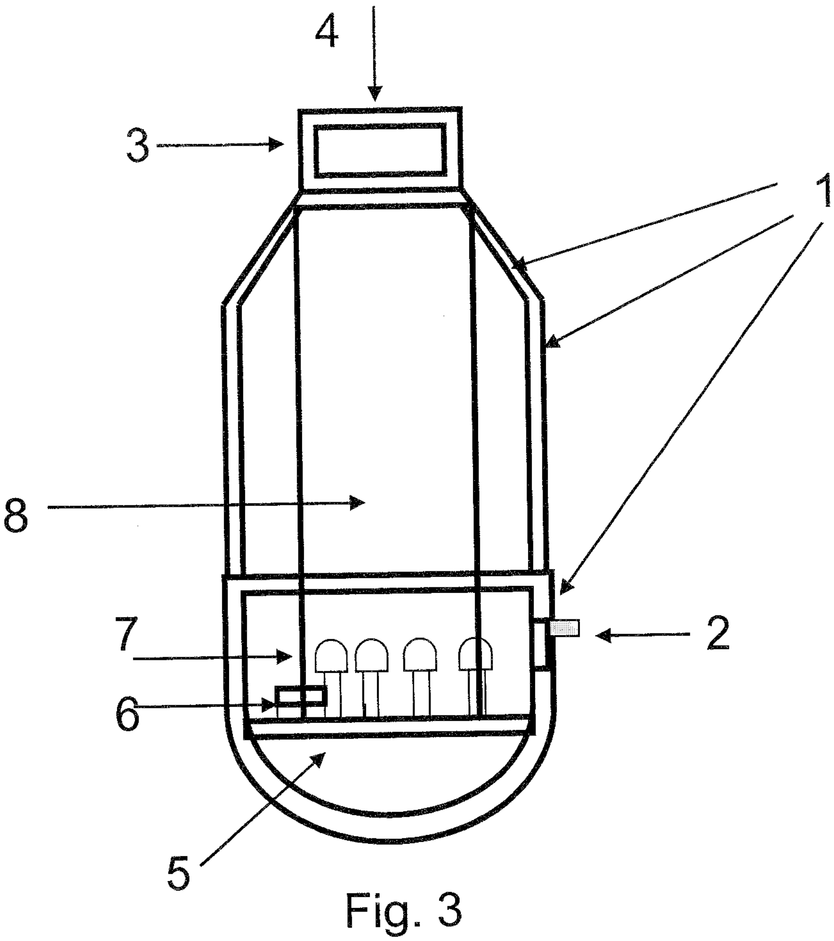
FIG. 3 illustrates the internal appearance of the device depicted at the vertical plane represented by the section line 3-3 of FIG. 1.

FIG. 3 illustrates the internal appearance of the device depicted at the vertical plane represented by section line 3-3 of FIG. 1. The exterior profile of case 1 includes multiple angled walls. The on/off switch 2 controls power to the circuit board 5 contained in the device. The observation opening 3 provides viewing of the interior and the subsequent lighting effects. Line 4 shows the direction of viewing for internal visualization. The circuit board 5 supports the circuit that generates the lighting effects. Integrated circuit 6 generates the signals that illuminate the LEDs 7. One of the surfaces of the mirrors 8 is shown placed in a prismatic fashion that leads to the repeated reflecting of the light from the LEDs. This generates the visual effects of moving shiny reflections that simulate the dynamic lighting aspect of a starry sky, or of a moving galaxy.

Figure 4:
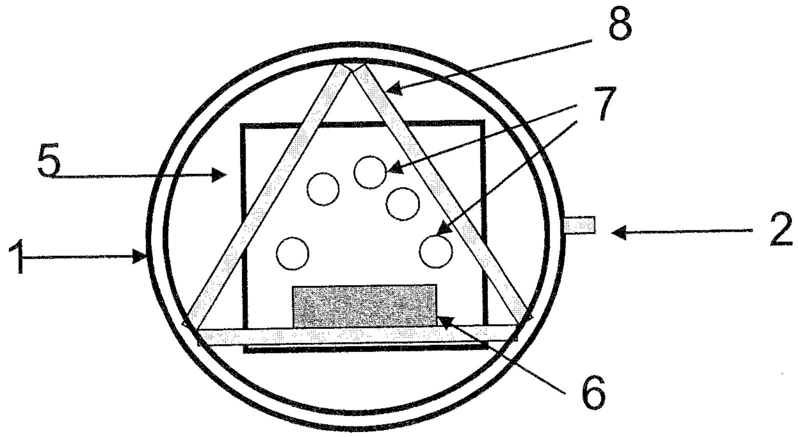
FIG. 4 illustrates the internal appearance of the device depicted at the horizontal plane represented by the section line 4-4 of FIG. 1.

Shown in FIG. 4 is a horizontal cross-section defined by section line 4-4 in FIG. 1. The walls of the case 1 are shown, as is the on/off switch 2. The supporting circuit board 5 for the electronic circuit and integrated circuit 6 that generates the lighting effects are also shown. LEDs 7 are shown in the interior of the mirrors 8, which in this embodiment are arranged in a triangular prismatic shape.

Figure 5:
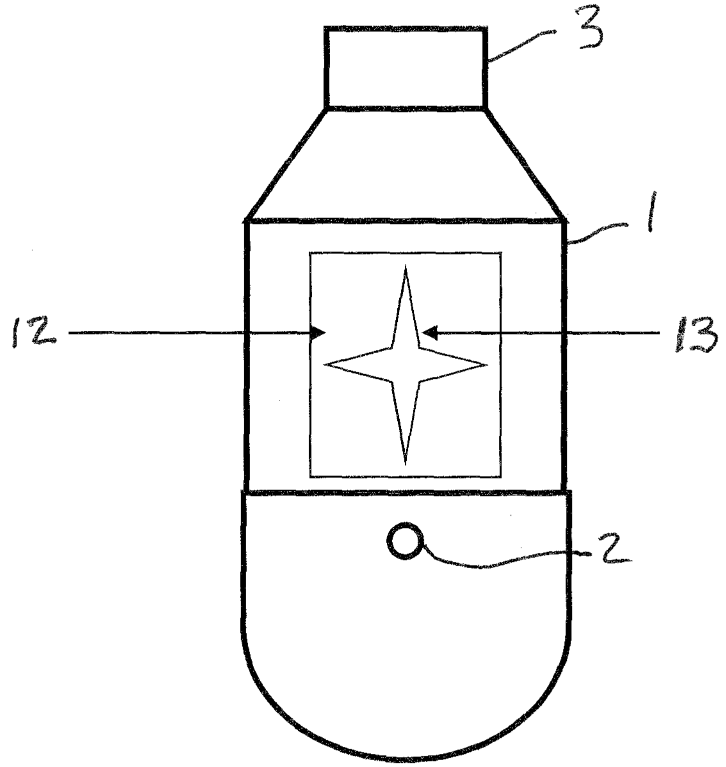
FIG. 5 is an external view of the device already decorated for a particular promotional or souvenir use.
Figure 6:
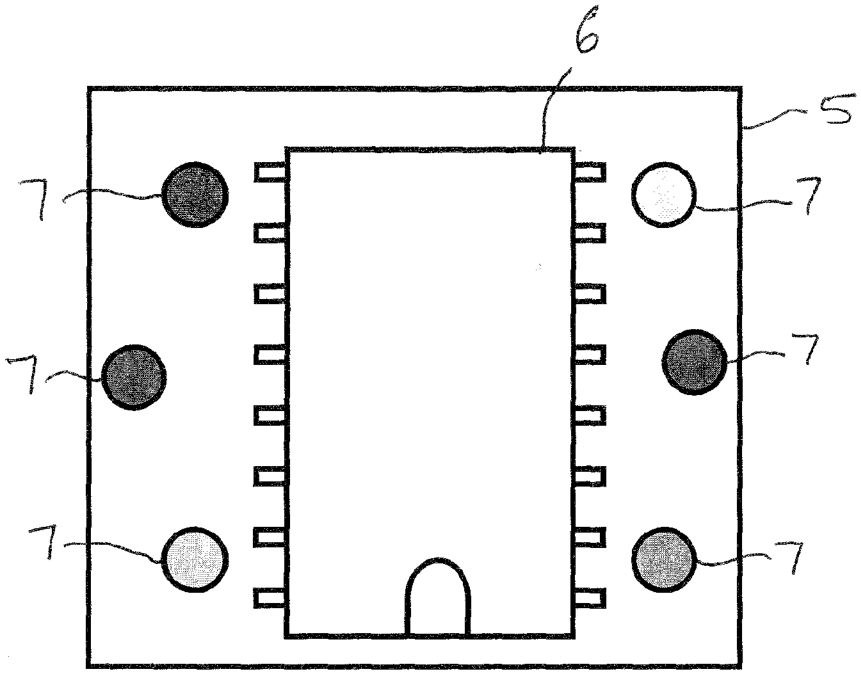
FIG. 6 is a view of the circuit board, integrated circuit, and LEDs of the device of FIG. 1.

FIG. 5 is an external view of the device already decorated for a particular use. Area 12 on the side is the space where a personality, celebrity, business, entity, event, or other identity would be depicted for promotion or souvenir. Decoration 13, in this case a star, is an image or colors specific to the identity to be promoted.

While the invention has been illustrated and described in detail in the foregoing drawings and description, the same is to be considered as illustrative and not restrictive in character, it being understood that only illustrative embodiments thereof have been shown and described and that all changes and modifications that are within the scope of the claimed subject matter are desired to be protected.

The invention claimed is:

1. A luminescent electronic device, comprising:

a case defining an interior, an exterior, and an opening, the interior and opening arranged so that the interior is dark and the dark interior can be viewed through the opening from the exterior when the device is off;

an electronic circuit located inside the case;

a plurality of lights located inside the case and selectively driven by the electronic circuit:

a system of mirrors arranged along the inside of the case in a polygonal arrangement such that when the device is turned on the plurality of lights are reflected in the mirrors and the plurality of lights and reflections of the plurality of lights in the mirrors can be viewed through the opening; and a decoration on the exterior of the case, the decoration depicting an identity to be promoted; and wherein:

the lights and mirrors produce a visual effect that simulates looking into a starry sky or a galaxy in motion, allowing association of the idea of a “star” with the identity to be promoted;

the circuit provides selective illumination of lights in varying patterns and visual effects; and the selective illumination includes variation in color and speed of the patterns and visual effects.

2. The luminescent electronic device according to claim 1, further comprising a switch, that when actuated, will initiate the visual effect, and when not actuated, will interrupt the visual effect causing the inside of the device to become dark.

3. The luminescent electronic device according to claim 1, wherein the identity to be promoted that is identified by the decoration is one of an athlete, celebrity, artist, group, and business.

4. The luminescent electronic device according to claim 1, wherein the identity to be promoted that is identified by the decoration is an event.

5. The luminescent electronic device according to claim 1, wherein that the decoration includes one of colors, symbols or shapes associated with the identity to be promoted.

6. The luminescent electronic device according to claim 1, wherein the pattern and visual effect is selected to provide a feeling of relaxation due to the beauty and variety of the effects of light and color that it presents upon activation of the switch.

7. The luminescent electronic device according to claim 1, wherein the lights include LEDs.

8. The luminescent electronic device according to claim 1, wherein the case is in the shape of one of a monocular, binocular and telescope.

9. The luminescent electronic device according to claim 1, wherein the circuit and LEDs provide a different visual effect with each subsequent actuating of the switch.

10. A luminescent electronic device, comprising:

a case defining an interior, an exterior, and an opening, the interior and opening arranged so that the interior is dark and the dark interior can be viewed through the opening from the exterior when the device is off;

an electronic circuit located inside the case;

a plurality of lights located inside the case and selectively driven by the electronic circuit:

a system of mirrors arranged along the inside of the case in a polygonal arrangement such that when the device is turned on the plurality of lights are reflected in the mirrors and the plurality of lights and reflections of the plurality of lights in the mirrors can be viewed through the opening; and a decoration on the exterior of the case, the decoration depicting an identity to be promoted; and wherein:

the lights and mirrors produce a visual effect that simulates looking into a starry sky or a galaxy in motion, allowing association of the idea of a “star” with the identity to be promoted; and wherein the lights include LEDs alternating flashed on and off.

11. The luminescent electronic device according to claim 10, wherein the circuit and LEDs provide a different visual effect with each subsequent actuating of the switch.

12. A luminescent electronic device, comprising:

a case defining an interior, an exterior, and an opening, the interior and opening arranged so that the interior is dark and the dark interior can be viewed through the opening from the exterior when the device is off;

an electronic circuit located inside the case;

a plurality of lights located inside the case and selectively driven by the electronic circuit:

a system of mirrors arranged along the inside of the case in a polygonal arrangement such that when the device is turned on the plurality of lights are reflected in the mirrors and the plurality of lights and reflections of the plurality of lights in the mirrors can be viewed through the opening; and a decoration on the exterior of the case, the decoration depicting an identity to be promoted; and wherein:

the lights and mirrors produce a visual effect that simulates looking into a starry sky or a galaxy in motion, allowing association of the idea of a “star” with the identity to be promoted; and the circuit has an adjustable speed.

* * * * *